Feb. 12, 1929.
A. MOORHOUSE
1,701,585
MOTOR VEHICLE BRAKING MECHANISM
Filed Jan. 23, 1924 2 Sheets-Sheet 1
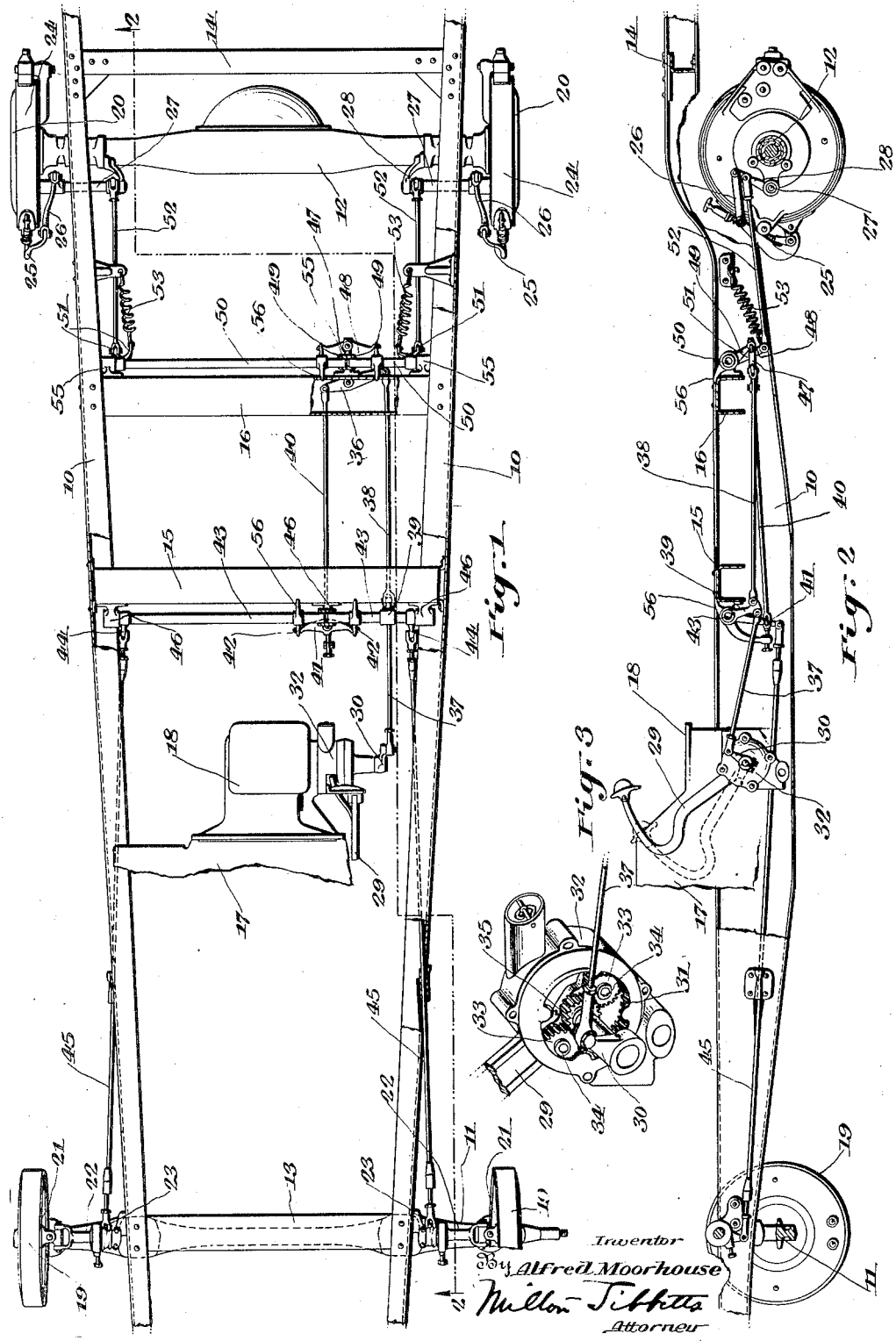
Inventor
Alfred Moorhouse
Attorney Feb. 12, 1929.  1,701,585
A. MOORHOUSE
MOTOR VEHICLE BRAKING MECHANISM
Filed Jan. 23, 1924   2 Sheets-Sheet 2
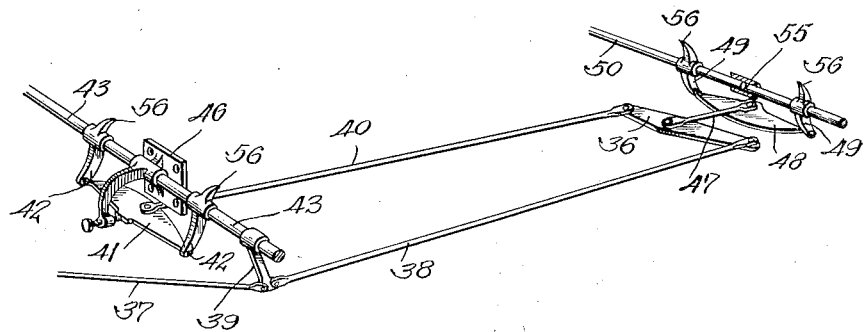
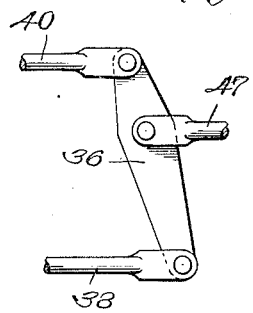
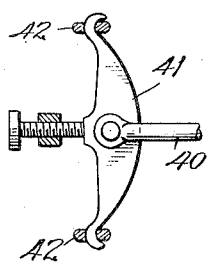
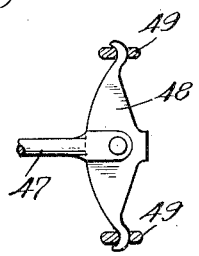
Inventor
Alfred Moorhouse.
Attorney Patented Feb. 12, 1929.

1,701,585

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE BRAKING MECHANISM.

Application filed January 23, 1924. Serial No. 688,044.

This invention relates to motor vehicles and particularly to the braking mechanism thereof.

One of the objects of the invention is to provide a simple and efficient braking mechanism for a motor vehicle.

Another object of the invention is to provide a simple and efficient lever mechanism for a motor vehicle having brakes on all four wheels.

Another object of the invention is to provide a four wheel brake mechanism with a simple form of equalizing mechanism between the brakes of each pair and an unequal application of brake pressure between the pairs of brakes.

Another object of the invention is to provide a motor vehicle with a braking mechanism embodying a simple step-up mechanism between the brake lever and the equalizing mechanism of the brakes.

Other objects of the invention will appear from the following description taken in connection with the drawings, which form a part of this specification, and in which:

Fig. 1 is a plan view of a motor vehicle embodying the invention;

Fig. 2 is a side elevation, partly in section, of the vehicle shown in Fig. 1, the section being substantially on the line 2—2 of Fig. 1;

Fig. 3 is a perspective view of the step-up mechanism between the brake lever and the second or operating lever.

Fig. 4 is a somewhat diagrammatic perspective view of the transmitting and equalizing connections, and Figs. 5, 6 and 7 are detail views of portions of the mechanism shown in Fig. 4.

Referring to the drawings, 10 represents the frame of a motor vehicle, 11 is the front axle, and 12 is the rear axle of the vehicle. A front cross member of the frame is indicated at 13, a rear cross member at 14, and two intermediate cross members are shown at 15 and 16 respectively. The motor of the vehicle is indicated at 17 and the clutch and gear box at 18, the latter being supported by the motor and the motor being supported on the frame in the usual manner.

The wheels of the vehicle have been removed but their brake drums are illustrated and the front drums are numbered 19 and the rear drums 20. Mounted upon the front axle are front wheel brakes 21 operated by short shafts 22 and levers 23. The rear brakes are indicated at 24 and these are operated by levers 25, links 26, shafts 27, and arms 28 on the shafts, the shafts 27 being mounted on or supported by the axle 12.

Thus we have a pair of front brakes and a pair of rear brakes and all of these brakes are intended to be operated by a single brake lever, the brake lever shown being in the form of a foot lever or pedal and indicated at 29. This lever is supported upon the side of the gear box 18 and is adapted for movement from the position shown in full lines in Fig. 2 to the position shown in dotted lines therein. Connecting mechanism from the lever 29 to all of the brakes is in the form of levers, connecting rods, and rock shafts, together with springs for retracting the brakes. This mechanism, as shown herein, equalizes the pressure between each of the brakes of the front pair, equalizes the pressure between each of the brakes of the rear pair, and applies a differential of pressure between the pairs of brakes, that is, greater pressure is applied to the rear pair of brakes than to the front pair of brakes. This latter is accomplished by intermediate leverage between the brake lever 29 and the equalizing device of the respective pairs of brakes. Take-up of slack in the various connections is insured by the arrangement of a step-up mechanism between the brake lever 29 and the mechanism connecting the pairs of brakes. The particular form of step-up mechanism forms no part of this invention, being described and claimed in a separate application, but it has particular advantages in connection with the other mechanism shown, as it quickly takes up the slack in the connections during the initial movement of the pedal 29 and by reason of the relationship of the levers which it operates, the leverage is greatly increased towards the end of the movement of the pedal 29 so that the brakes may be applied with great pressure with a relatively light pressure on the pedal 29.

The step-up mechanism referred to is shown in some detail in Fig. 3. It is arranged between the brake lever 29 and a second lever 30 which is mounted co-axial with the lever 29. An internal gear 31 is also mounted coaxial with the levers 29 and 30 and is bolted to the casing 32 which supports the levers 29 and 30 on the side of the gear box 18. A pair of planetary gears 33 are mounted on spindles 34 on the lever 29 and these gears mesh with the stationary internal gear 31 and with a pinion 35 on the shaft of the lever 30. Since the pinion 35 is considerably smaller than the internal gear 31, it will be seen that oscillation of the brake lever 29 carrying the spindles 34 will cause the pinion 35 to rotate or oscillate about the common axis of the pinion and the brake lever 29 twice as fast or through twice as great an arc as the brake lever 29. In other words, the speed of the pinion 35 is stepped-up to twice the speed of the brake lever 29 and of course the second lever 30 is carried with the pinion 35 in this stepped-up movement.

For providing a differential of pressure between the pairs of brakes, a floating lever 36 is used. This lever is connected at one end to the operating lever 30 through rods 37 and 38 and a rock arm 39, the latter being provided merely for directing the rods beneath the frame cross member 15. The opposite end of the floating lever 36 is connected by a rod 40 with an equalizing bar 41 arranged between the two downwardly extending arms 42 on a pair of co-axially mounted rock shafts 43 which are in turn connected by arms 44 and rods or cables 45 with the operating levers or arms 23 of the front brakes. The rock shafts 43 are supported by the frame cross member 15 in suitable brackets or bearings 46, the intermediate bracket 46 being shown as supporting the adjacent ends of the co-axial shafts 43.

At an intermediate point the floating lever 36 is connected by a rod 47 to an equalizing bar 48 between arms 49 on a pair of co-axial rock shafts 50, which rock shafts are in turn connected by downwardly extending levers or arms 51 and rods 52 with the operating arms 28 of the rear brakes. Retracting springs 53 are connected between the arms 51 and the side members of the frame 10, as shown in Figs. 1 and 2, for the purpose of retracting the entire brake mechanism. The rock shafts 50 are supported on the frame cross member 16 by brackets 55, the intermediate bracket supporting the contiguous ends of the rock shafts. Suitable stops 56 are shown for limiting the retracting movement of the brakes, similar stops being also indicated on the front rock shafts 43.

It will be seen that the rod 47 for the rear brakes is connected somewhat nearer to that end of the lever 36 to which the rod 40 is connected, whereby greater leverage is produced on the rear brakes than on the front brakes. This differential of leverage and of power applied as between the pairs of brakes is for the purpose of insuring that the rear brakes shall slide before the front brakes become locked. It will be seen also that the floating lever 36 is not connected to the vehicle frame but is supported by the levers to which it is connected.

The operation of the invention will be apparent from the foregoing description. Upon depression of the brake lever 29 by the vehicle operator, the rods 37 and 38 are drawn forwardly, thus tending to swing the floating lever 36 so as to produce a rearward motion of the rod 40 and a forward motion of the rod 47. The rearward motion of the rod 40 draws the fulcrum of the equalizing bar 41 to the rear, so that equal torque is applied through the arms 42 to the rock shafts 43, and consequently equal tension is applied through the arm 44 to the rods or cables 45. In this way an equal application of the pair of front brakes 21 is secured through the lever 23 and the brake shafts 22.

The forward motion of the rod 47 draws the fulcrum of the equalizing bar 48 forward in a similar manner, applying equal torque to the shafts 50, and through the arm 51, rods 52 and brake operating arms 28, making an equal application of the pair of rear brakes 20. By reason, however, of the unequal arms of the floating lever 36, the application of the rear brakes is heavier than the application of the front brakes, thus securing the desired differential of pressure between the pairs of brakes.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with a pair of front brakes and a pair of rear brakes, of a brake lever, a second lever, step-up mechanism from said brake lever to said second lever, a floating lever connected to both pairs of brakes, and a connection from said second lever to said floating lever.

2. In a motor vehicle, the combination with a pair of front brakes and a pair of rear brakes, of a brake lever, a second lever, step-up mechanism between the brake lever and said second lever, equalizing devices between the brakes of each pair, and connections from said second lever to said equalizing devices for operating all of said brakes, said mechanism applying greater braking force to one pair of brakes than to the other.

3. In a motor vehicle, the combination of a pair of front brakes and a pair of rear brakes, of a brake lever, a second lever, step-up mechanism between the brake lever and the second lever, an equalizing device between the brakes of one of said pair, a floating lever, a connection from said floating lever to said equalizing device, a connection from said floating lever to the other pair of brakes, and a connection from said second lever to said floating lever.

In testimony whereof I affix my signature.

ALFRED MOORHOUSE.